United States Patent [19]

Sakata

[11] Patent Number: 4,614,506
[45] Date of Patent: Sep. 30, 1986

[54] SPLINED PROPELLOR SHAFT IN WHICH THE SPLINED SECTIONS ASSUME A CONSISTENT RADIAL RELATION WHEN ROTATED

[75] Inventor: Tetsushin Sakata, Tokyo, Japan

[73] Assignee: Nissan Motor Co., Ltd., Yokohama, Japan

[21] Appl. No.: 699,922

[22] Filed: Feb. 8, 1985

[30] Foreign Application Priority Data

Feb. 10, 1984 [JP] Japan ............................ 59-16863[U]

[51] Int. Cl.[4] .......................... F16C 3/03; F16D 3/06; F16F 15/22
[52] U.S. Cl. .................................... 464/162; 403/359; 464/180
[58] Field of Search ............. 74/573 R, 574; 403/359; 464/158, 162, 179, 180

[56] References Cited

U.S. PATENT DOCUMENTS 3,940,948  3/1976  Schultenkamper ............. 464/180 X
4,106,311  8/1978  Euler ................................. 464/162 X
4,406,641  9/1983  Mallet ................................. 464/162

FOREIGN PATENT DOCUMENTS 365912  1/1963  Switzerland ........................ 464/180
465259  5/1937  United Kingdom ................ 464/180

Primary Examiner—Stuart S. Levy
Assistant Examiner—Daniel P. Stodola
Attorney, Agent, or Firm—Schwartz, Jeffery, Schwaab, Mack, Blumenthal & Evans

[57] ABSTRACT

A splined, two-piece propellor shaft with radial clearance between the inner and outer splined members which permits them to move radially relative to each other in which an asymmetrical weight distribution around the circumference of at least one of the members is provided on either or both of the inner and outer members to generate a centrifugal force upon rotation of the propellor shaft which causes predetermined portions of the members to move radially into tight engagement with each other so that the splined sections consistently assume the same radial relation during rotation.

7 Claims, 7 Drawing Figures

SPLINED PROPELLOR SHAFT IN WHICH THE SPLINED SECTIONS ASSUME A CONSISTENT RADIAL RELATION WHEN ROTATED

BACKGROUND OF THE INVENTION

1. Field of the Invention

The invention relates to a propellor shaft which has a sliding joint in its central section.

2. Description of the Prior Art

There are conventional propellor shafts which have sliding joints in the middle. The shaft consists of two separate shafts which are coupled by a spline. When the machinery is assembled, an engineer has to measure and correct unbalance in the propellor shaft while the shaft is rotating. However it is difficult to accurately measure the two ends of the propellor shaft because of play in the spline. In a case where unbalance remains in the propellor, vibrations are produced during running which cause unpleasant noise in a passenger compartment.

SUMMARY OF THE INVENTION

An object of the invention is to provide a propellor shaft in which it is possible to accurately measure and correct the unbalance at both ends of the propellor shaft.

Another object of the invention is to reduce vibrations and noise which are produced in a propellor shaft.

A further object of the invention is to provide a propellor shaft capable of rotating without change in its coupling condition.

These and other objects and advantages are accomplished by keeping the spline coupling in a fixed position when the propellor shaft rotates. The propellor shaft comprises a first shaft having an internal splined section, a second shaft having an external splined section which is engaged with the internal section of the first shaft in an intermediate position of the propellor shaft, and weight means provided for the first or second shaft to generate a centrifugal force at the splined section during rotation.

DETAILED DESCRIPTION OF THE PREFERRED EMBODIMENTS

To facilitate the understanding of the present invention, a brief reference will be made to a conventional device.

Figure 1:
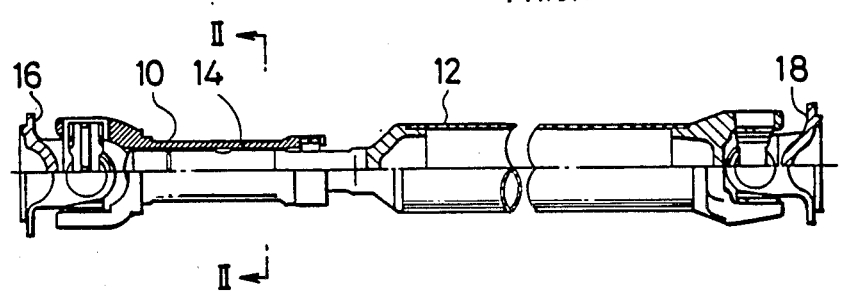
FIG. 1 is a front view, partly in section, showing a conventional propellor shaft.
Figure 2:
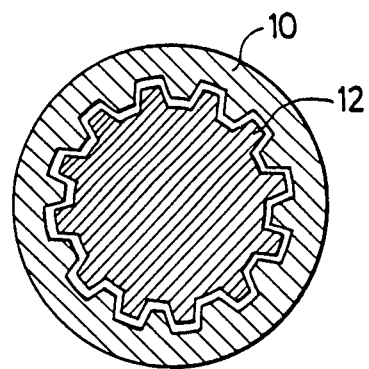
FIG. 2 is a cross section view taken along the line II—II of FIG. 1.

Referring to FIG. 1, a conventional propellor shaft is illustrated, for example, as shown in Nissan Service Bulletin No. 424 (published by Nissan Motors Co., Ltd., June 1980). This shaft consists of two separate shafts 10 and 12. These two propellor shafts 10 and 12 are coupled by a spline 14, which forms a sliding joint. That is to say, the shaft 10 is splined on its internal circumference, and the shaft 12 is splined on its outer circumference. At the ends of shafts 10 and 12 remote from spline 14 flange yokes 16 and 18 are provided, respectively. For example, one flange yoke 16 is coupled to a differential gear, while the other flange yoke 18 is coupled to a final drive. This makes it possible for rotation to be transmitted between the gear and the final drive. In this case, the spline 14 serves the function of transmitting the rotation without transmitting changes in shaft direction. The shafts 10 and 12 are made with weight distributions that are symmetrical with respect to the center of rotation so that unbalance does not occur. Since unbalance in the propellor shaft can produce vibrations that cause noise in the passenger compartment, balance is corrected while the machinery is assembled, as shown in FIG. 1. Balance is corrected by attaching balance weights to both ends of the propellor shaft, that is, to the parts near the flange yokes 16 and 18. Since play occurs in the spline 14 in the radial direction (refer to FIG. 2) it is likely that the shafts 10 and 12 will move respective to each other during rotation. For this reason, the unbalance cannot be corrected accurately, namely, even if accurate balance is obtained in respect to one condition of the coupling, unbalance may be produced a change of the condition during operation. This unbalance causes vibrations which are transmitted to the interior of the passenger compartment where they produce noise. If the radial gaps in the spline are reduced, the accuracy of the balance correction can be improved, but considering the function of the spline, the gaps in the radial direction cannot be completely reduced to zero. In addition, even if the two shafts were connected to each other by a bearing in the vicinity of the spline, the play in the radial direction could not be completely eliminated.

Embodiments of this invention are explained below with reference to attached FIGS. 3 through 7.

Figure 3:
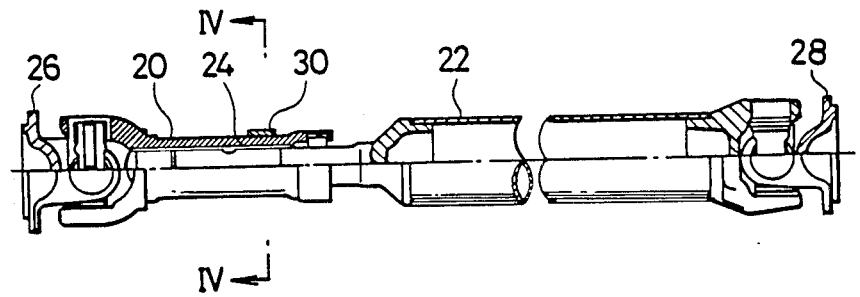
FIG. 3 is a front view, partly in section, showing a first embodiment of a propellor shaft according to the invention.
Figure 4:
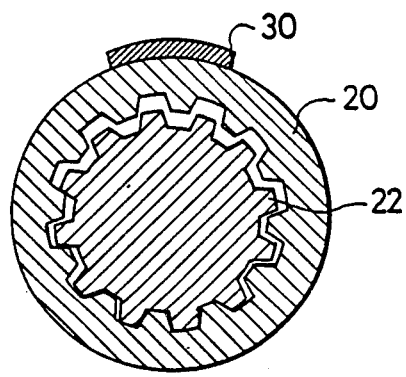
FIG. 4 is a cross section view taken along the line IV—IV of FIG. 3.

A first embodiment of the invention is shown in FIGS. 3 and 4. A propellor shaft shown in FIG. 3 consists of two shafts 20 and 22. The shafts 20 and 22 are coupled to each other by the spline 24. That is to say, the shaft 20 is splined along its inner circumference at one end, and the shaft 22 is splined along its outer circumference at one end. At the other end of the shaft 20 a flange yoke 26 is provided, and at the other end of the shaft 22 a flange yoke 28 is provided. A weight 30 is attached to the splined outer circumference of the shaft 20 as shown in FIG. 4. This is to say, the shaft 20 has an asymmetical weight distribution with respect to the center of rotation.

Next, how this embodiment works will be explained. The flange yoke 26 is coupled to a gear, and the flange yoke 28 is coupled to a final drive. By rotating the propellor shaft, rotational force is transmitted between the gear and the final drive. While the propellor shaft is rotating, a centrifugal force arises on the weight 30 attached to the shaft 20 in the direction of the weight 30. For this reason, as shown in FIG. 4, the gap on the side on which the weight 30 is attached becomes larger, while on the opposite side the teeth of the spline are pressed tightly against the teeth of the shaft. When the propellor shaft is rotated, the spline always couples to the shaft in this manner. Now if the unbalance is measured at both ends of the propeller shaft, the unbalance can be measured accurately. Consequently, it is possible to attach the correct balance weights to achieve an accurate balance correction. Moreover, in this embodiment, all that is required is to attach a weight 30 to a conventional propellor shaft as shown in FIG. 1 to accomplish the purpose of this invention.

Figure 5:
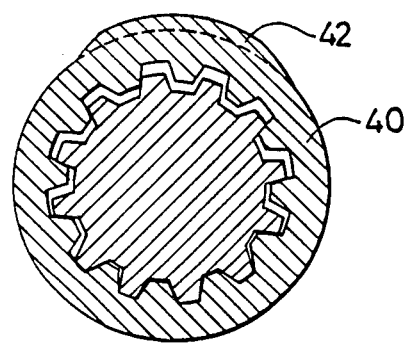
FIG. 5 is a cross section view showing a second embodiment of a propellor shaft according to the invention.

A second embodiment of the invention is shown in FIG. 5. In this embodiment an asymmetrical weight distribution is produced by thickening the metal along one part of the circumference of a shaft 40 to produce the thickened section 42. Also, in this case, when the propellor shaft is rotated, a centrifugal force arises on the thickened section 42 producing the same effect as in the previously described first embodiment. Since, in this embodiment, the thickened section 42 is formed in one piece with the shaft 40, there is no danger that the weight will fall off.

Figure 6:
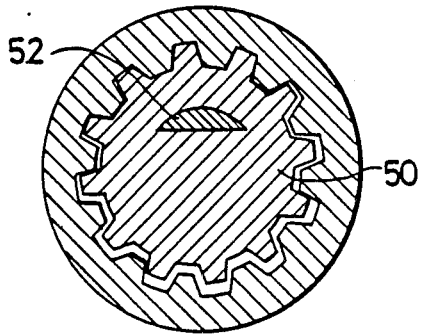
FIG. 6 is a cross section view showing a third embodiment of a propellor shaft according to the invention.

A third embodiment of the invention is shown in FIG. 6. In this embodiment the weight 52 is incorporated into the shaft 50 which is splined around its outer circumference. In this case a centrifugal force arises on the weight 52 so that when the propellor shaft is rotated the splines are always coupled in a fixed position. Weight 52 is buried inside the shaft 50, so that a symmetrical exterior appearance is preserved.

Figure 7:
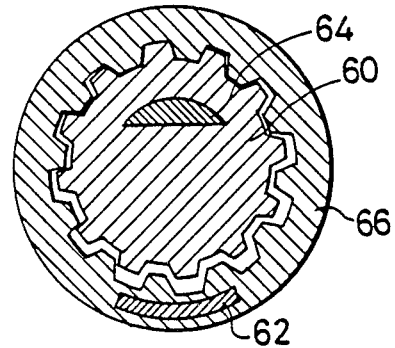
FIG. 7 is a cross section view showing a fourth embodiment of a propellor shaft according to the invention.

A fourth embodiment of the invention is shown in FIG. 7. In this embodiment a weight 62 is incorporated into the shaft 66 at the same time that a weight 64 is incorporated into the shaft 60. The weights 62 and 64 are on opposite sides of the axis from each other. It is clear that the effect will be the same as that in the preceding embodiment. Also in this embodiment, by burying the weights 62 and 64 internally an outward appearance of symmetry is maintained.

In the embodiments described here, it has been explained that one end of the propellor shaft is coupled to a gear and the other end to a final drive with a sliding joint in the middle, but even if the propellor shaft is supported at locations other than the two ends, as long as it has a sliding joint in the middle it is clear that the present invention can be applied.

The foregoing detailed description has been given for clearness of understanding only, and no unnecessary limitations should be understood therefrom, as modifications will be obvious to those skilled in the art.

What is claimed is:

1. A propellor shaft for transmitting power between a source of rotational motion and a driven member, said shaft comprising:
   a first shaft having an internally splined section at one end thereof;
   a second shaft having an externally splined section at one end thereof; said externally splined section of said second shaft being slidingly received within said internally splined section of said first shaft with a radial clearance which permits radial movement of said externally splined section and said internally splined section relative to each other, and
   means on at least one of said first and second shafts for causing a predetermined portion of the circumference of one splined section to move radially into tight engagement with the other splined section as said propellor shaft is rotated, wherein said means for causing radial movement of said predetermined portion of said one splined section comprises weight means secured with said one splined section for producing an asymetrical circumferential weight distribution around said one splined section and generating a centrifugal force in a predetermined radial direction of said splined section whenever said propellor shaft is rotated, whereby said splined sections consistently assume that same radial relation with respect to each other whenever said propellor shaft is rotated.

2. A propellor shaft according to claim 1, wherein said weight means is a weight attached to the external surface of the internally splined section.

3. A propellor shaft according to claim 1, wherein, said weight means is a thickened section integrally formed on the external surface of the internally splined section of the first shaft.

4. A propellor shaft according to claim 1, wherein said weight means is an embedded weight in the externally splined section of the second shaft.

5. A propellor shaft according to claim 1, wherein, said weight means consists of embedded sections in the internally splined section of the first shaft and the externally splined section of the second shaft, the embedded sections being positioned in an opposite relation with respect to the center of rotation.

6. A propellor shaft according to claim 1, wherein said weight means are provided on at least one of said internally splined section and said externally splined section.

7. A propellor shaft according to claim 1, further comprising weight means adjacent the other ends of said first and second shafts for rotationally balancing the propellor shaft.

* * * * *